United States Patent [19]
Kanoh et al.

[11] Patent Number: 6,109,524
[45] Date of Patent: Aug. 29, 2000

[54] AUTOMATIC COMMODITY HANDLING APPARATUS UTILIZING IC CARD

[75] Inventors: Chiyuki Kanoh; Futaba Komatsu; Tsuguhiro Takayama; Masanori Itoh, all of Nagano-ken, Japan

[73] Assignee: Nippon T.M.I. Co., Ltd., Matsumoto, Japan

[21] Appl. No.: 09/043,820

[22] PCT Filed: Jul. 31, 1997

[86] PCT No.: PCT/JP97/02695

§ 371 Date: May 22, 1998

§ 102(e) Date: May 22, 1998

[87] PCT Pub. No.: WO98/04969

PCT Pub. Date: Feb. 5, 1998

[30] Foreign Application Priority Data

Jul. 31, 1996 [JP] Japan ..................................... 8-201356
Jul. 31, 1996 [JP] Japan ..................................... 8-201357

[51] Int. Cl.[7] ........................................................ G06F 7/08
[52] U.S. Cl. ............................................. 235/381; 235/380
[58] Field of Search ................................... 235/379, 381, 235/380; 705/41

[56] References Cited

U.S. PATENT DOCUMENTS 5,577,121  11/1996  Davis et al. .............................. 380/24
5,949,046  9/1999  Kenneth .................................. 235/380

FOREIGN PATENT DOCUMENTS

| | | |
|---|---|---|
| 1-222395 | 9/1989 | Japan . |
| 2-24776 | 1/1990 | Japan . |
| 2-280294 | 11/1990 | Japan . |
| 4-131993 | 5/1992 | Japan . |
| 5-54241 | 3/1993 | Japan . |
| 5-73584 | 3/1993 | Japan . |
| 5-233959 | 9/1993 | Japan . |
| 6-203231 | 7/1994 | Japan . |

*Primary Examiner*—Karl D. Frech
*Attorney, Agent, or Firm*—Burns, Doane, Swecker & Mathis L.L.P.

[57] ABSTRACT

A store system has a card issue/money deposit machine (8) and a commercial-article handling machine (3) capable of vending and the like of commercial articles with utilization of the IC card (13). The card issue/money deposit machine (8) has a card issue means (8a) for issuing the IC card (13) based on input information of the customer, and a money processing means (8b) for recording input money in the IC card (13) as a deposit. The commercial-article handling machine (3) has an input means (3a) for inputting the kind and number and the like of commercial articles, IC card reader/writer (3b), a commercial-article handling means (3c) for conducting vending of commercial articles and the like based on the input information of commercial articles and the recorded information of the IC card, and a calculation means (3d) for subtracting the amount of deposit recorded in the IC card according to commercial articles to be handled. By making use of the IC card having a memory capacity larger thank the magnetic card, automatic vending, renting and other operations of various commercial articles can be carried out.

5 Claims, 6 Drawing Sheets

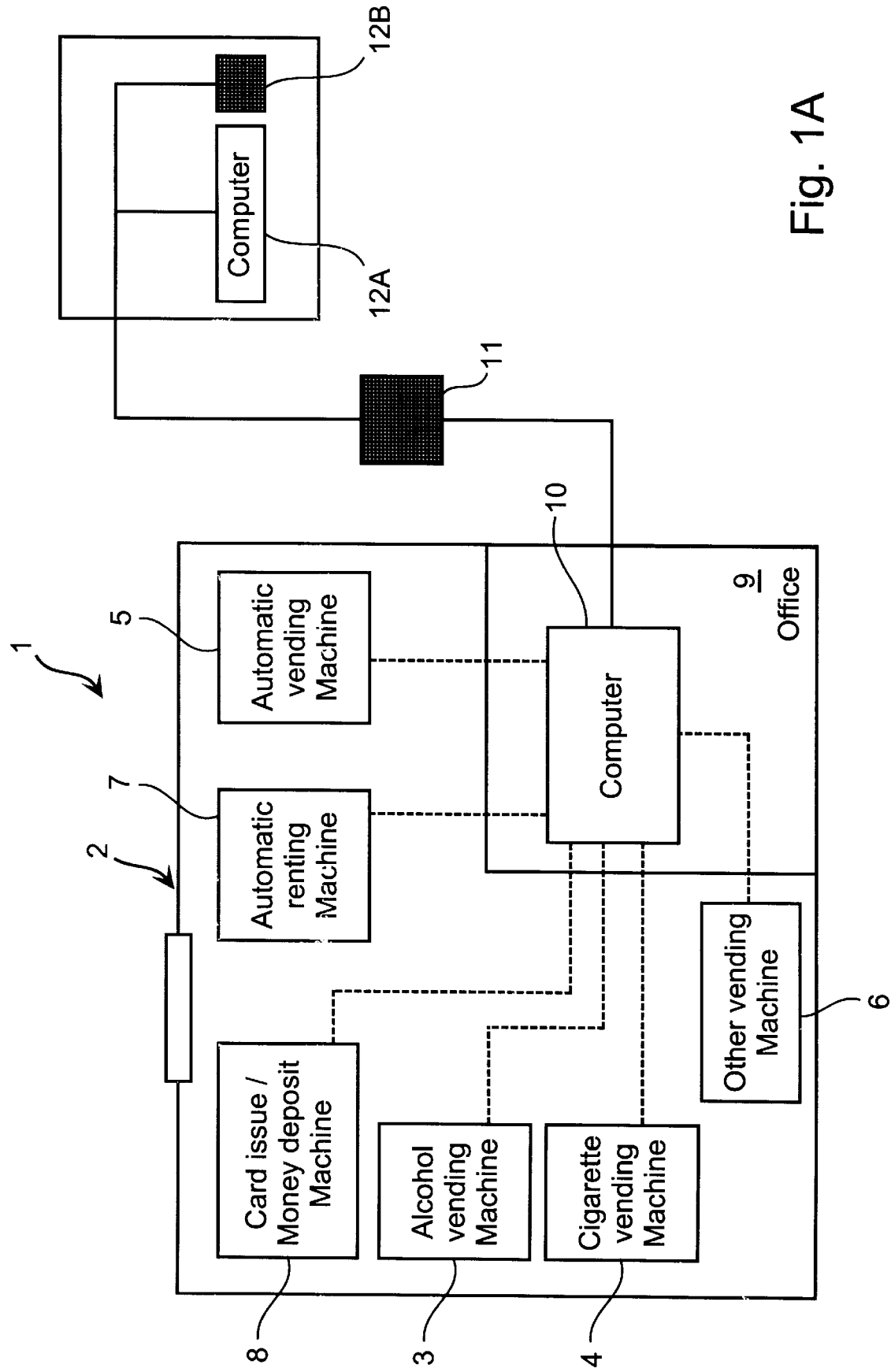

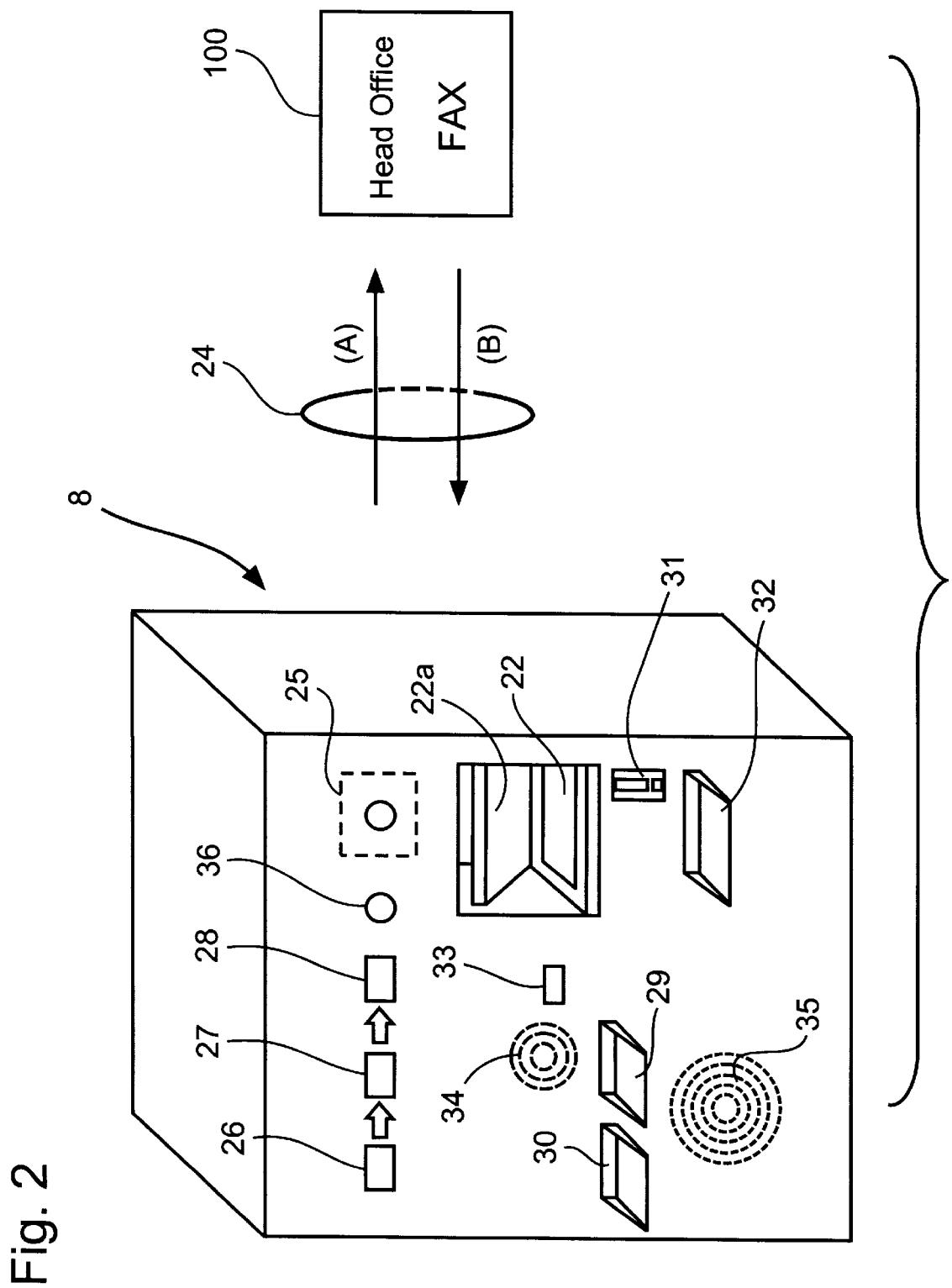

1

AUTOMATIC COMMODITY HANDLING APPARATUS UTILIZING IC CARD

TECHNICAL FIELD

The present invention relates to an automatic commercial-article handling system which is able to processes rental of videocassette tapes, vending of commercial articles such as magazines, cigarettes and others in a manner efficiently by making use of the IC card as customer card.

The present invention also relates to an automatic renting system for recorded media utilizing the IC card that is suitable for renting recorded media such as videocassettes.

Further, the present invention relates to an IC card issue machine suitable for use in an automatic commercial-article handling system which is able to process rental of videocassette tapes, vending of commercial articles such as, magazines, cigarettes and other items in an efficient manner by making use of the IC card.

Furthermore, the present invention relates to an IC card issue system in which issue operations of a plurality of IC card issue machines equipped in a branch shop can be controlled via communications line by a control computer equipped in a head office.

BACKGROUND ART

In recent years, in view of rise of labor cost, midnight operation or the like, there have been adopted a manned/unmanned store system wherein automatic vending machines for commercial articles, automatic renting machines for videocassette tapes and the like are equipped in a store. This kind of system requires no permanently-stationed clerks for selling and renting commercial articles.

Where such a system is employed, it is convenient to use prepaid cards or other cards for purchase of commercial articles instead of using cash. Prepaid cards that are generally used are, however, of magnetically recorded type and have no capacity of storing a large amount of information. Thus, this kind of cards are not suitable for use in such stores as selling and renting a variety of commercial articles.

On the other hand, where rental shops are concerned for conducting renting/returning of recorded media such as videocassette tapes automatically, the use of automatic renting machines becomes wide spread. In this case also, settlement of rental fees is carried out by using the prepaid membership card. Since the generally-used membership card is of magnetically recorded type, the amount of information that can be stored therein is low, thereby restricting applications thereof.

As mentioned above, the generally-used prepaid card or membership card is of magnetically recorded type, and is restricted in recording capacity thereof. Thus, it is not suitable for use in a store system where a variety of commercial articles are sold and rented.

In addition, where the magnetically-recorded membership card is used in an automatic renting machine for recorded media such as videocassette tapes, such a card is limited in the amount of information that can be recorded therein and therefore is restricted in its applications.

Especially, in the case of automatic renting machines, when recorded media are for adults only, it is required to realize rental prohibition so as not to allow minors to rent such recorded media freely. For this end, adult and minor cards are generally issued as membership cards. However, where there are two kinds of cards issued, after a customer becomes adult, the membership card for this person must be changed to be the adult card, which is inconvenient.

Further, in the case of automatic renting machines, a general system is such that the exclusive card is issued for each of the renting machines and that the upper limit of the available number (renting number) is predetermined. For example, the maximum number of renting is set to be three, and renting of articles more than that number at the same time is prohibited. However, if the same customer holds utilization cards for individual rental machines, he or she is able to rent videocassette tapes or the like more than the maximum number.

DISCLOSURE OF THE INVENTION

In the consideration of the above problems, an object of the present invention is, paying attention to the IC card having recording capacity larger than the magnetic card, to provide an automatic commercial-article handling system for a store system capable of selling or renting various commercial articles automatically by making use of the IC card as customer card.

Further, an object of the present invention is to provide an automatic renting system for recorded media for a store system for renting recorded media such as videocassette tapes by making use of the IC card as customer card.

Furthermore, an object of the present invention is to provide an automatic renting machine for recorded media suitable for constituting the above automatic renting system for recorded media.

Further object of the present invention is to provide an IC card issue machine suitable for issuing the IC card used in a system for selling and renting commercial articles by making use of the IC card.

In addition, another object of the present invention is to provide an IC card issue system that is capable of remotely controlling unmanned card-issuing operations of the above IC card issue machine.

In order to realize the above objects, an automatic commercial-article handling system utilizing the IC card according to the present invention comprises a card issue machine for issuing the IC card as customer card, and a commercial handling machine capable of selling, renting and the like of commercial articles by making use of the IC card issued by the card issue machine.

The card issue machine has a card issue means for issuing an IC card based on input information by the customer, and a money handling means for recording the amount of money input by the customer as the amount of deposit in the IC card. While, the commercial-article handling machine has an input means for inputting the kind, number and the like of commercial articles, an IC card reader/writer, a commercial-article handling means for conducting selling, renting or returning operation of commercial articles based on commercial-article information input via the input means and on recorded information of the IC card, and a calculation means for processing subtraction of the deposit amount recorded in the IC card in accordance with commercial articles to be handled.

It is preferable that the money handling means of the card issue machine carries out premium giving operation on the deposit amount to be recorded in accordance with recorded contents in the IC card including the deposit amount and purchase record of commercial articles. For instance, a certain amount of premium is given where the deposit amount is high, or a variety of premium services are given according to frequency in use of the IC card.

It is also preferable that the date of the customer's birth is recorded in the IC card, and the commercial article handling machine conducts sales control of commercial articles based on the above recorded contents of the IC that is inserted therein. For example, an automatic vending machine for alcohol drinks, cigarettes or other items is able to conduct sales prohibiting operations to minors based on the contents of the IC card.

Further, it is convenient for customers to check the stock of commercial article, to order commercial articles and to do other operations from their homes, companies or other places. For this purpose, the automatic commercial-article handling system is provided with a control means for centrally controlling the commercial-article machine and a customer's terminal connected via a communications line to the control means, allowing the customer to conduct check of the stock, to order commercial articles or to do other operations via the customer's terminal.

Furthermore, it is preferable to repay the deposit when the customer wishes to return the IC card. For this, the money handling means of the money handling machine is provided with a function of repaying the balance of deposit recorded in the IC card.

Next, the above-constituted automatic commercial-article handling system utilizing the IC card can be adopted as an automatic renting system for videocassette tapes. The automatic renting system for videocassette tapes according to the present invention comprises a card issue machine for issuing the IC card as customer card, and a renting machine for automatically renting recorded media such as videocassette tapes by making use of the issued IC card. The card issue machine issues the IC card based on information input by the customer and the amount of input money. The renting machine also has an input means for inputting at least the kind and number of a recorded medium to be rented, an IC card reader/writer, a storing shelf for storing recorded media, a transfer mechanism for carrying out renting and returning operations of recorded media based on recorded information of the IC card, and a control means for controlling the respective portions.

The IC card is preferably provided with a memory area for storing at least identifying information of the customer, the balance of deposit, and information about renting of recorded media. Preferably, the information about renting of recorded media includes at least identification data of renting machines from which recorded media are rented out, identification data of rented recorded media, rental fees of the rented recorded media, and rented dates. Based on these information, it is possible to rent recorded media out from a renting machine and to return them to another renting machine. Therefore, there is no need to return the recorded media to the same renting machine, which is convenient for the customer.

In addition, a renting machine, to which a recorded medium rented out from another renting machine is returned, is constituted so that it is able to store the such recorded media separately, whereby operation of returning the recorded media back to the original renting machine becomes simplified. For this purpose, the renting machine is provided with a renting/returning shelf section exclusive for storing such recorded media as are under administration thereof and a spare shelf section for storing recorded media when such recorded media are returned as have been rented out from another renting machines.

On the other hand, the number of recorded media to be rented can be controlled based on that recorded in the inserted IC card. With this, each of a plurality of automatic renting machines can recognize the total number of recorded media that have been rented out by the same customer from respective automatic renting machines equipped in an automatic rental shop, whereby renting of recorded media more than the maximum number out to the same customer can easily be prevented.

Likewise, at the side of each automatic renting machine, it is possible to calculate the age of the customer from the date of the customer's birth recorded in the IC card, and to control renting operations of recorded media based on the calculated age. Whereby, both adult and minor cards need not to be issued as customer card. This is because the age of the customer is calculated based on the recorded date of the customer's birth, based on which it is possible to determine whether the customer is adult or not. This is also convenient for the customer since there is no need to have the card reissued even after he or she becomes adult.

Next, the present invention is directed to an IC card issue machine suitable for issuing the IC card utilized in the above-mentioned commercial-article handling system and renting machine for recorded media, which has the following features.

Namely, the IC card issue machine comprises an image scanning means for scanning an identification card of a person asking for membership and an application form for membership, an input means for the customer to input information, an issue means for issuing the IC card based on information from the image scanning means and the input means, a money handling means which conducts receipt, calculation and repayment of money and records the amount of money put by the customer in the IC card to be issued as a deposit, an IC card reader/writer, and a display means capable of displaying at least the amount of money put by the customer, the balance of deposit recorded in the IC card, and operational procedure of the issue machine.

For the purpose that premium and other services are offered to customers who use cards with high frequency and to those who have a large amount of deposit, the money handling means is constituted to give a premium to a deposit to be recorded based on the recorded contents of the IC card including the amount of deposit and purchase record of commercial articles.

Where the IC card to be issued is recorded the date of the customer's birth, it is allowed for the commercial-article handling system to calculate the age of the customer and controls sales of commercial articles based on the calculated age.

In addition, it is also preferable that the IC card is provided with a memory area capable of recording information concerning available commercial-article handling machines (vending machines and renting machines) and information about utilization record of these machines. With this, the state of usage by each customer can be read from the IC card, which is convenient.

Further, in order not to waste deposit money when the customer asks for quitting use of the card, the money handling means is preferably constituted to be able to repay the balance of deposit recorded in the IC card.

On the other hand, the present invention is directed to an IC card issue system suitable to allow the above-constituted IC card issue machine to carry out an unmanned issue operation thereof. The IC card issue system comprises the above-constituted IC card issue machine equipped in a branch shop, a control computer system equipped in a head office, and a communications means for transmitting and receiving information between the IC card issue machine and the control computer system.

In the IC card issue system of the present invention, the IC card issue machine transmits information received via the image scanning means and the input means to the control computer system at the side of the head office by means of the communications means. The control computer system determines whether membership is allowed to give or not based on the received information, and transmits the result of determination to the IC card issue machine via the communications means. Based on the transmitted information, issue of the IC card is controlled at the side of the IC card issue machine.

In order to assure identification of a person asking for membership, a camera means is accommodated such as a still camera or floppy-disc camera for taking a photograph of the person asking for membership, thereby taking a photograph of the person and comparing it with an identification card of the person such as his or her driver's license card.

BRIEF DESCRIPTION OF THE DRAWINGS

FIG. 2 is a structural view of a card issue machine that is applicable for realizing a card issue function of the card issue/money deposit machine of FIG. 1.

BEST MODE FOR CARRYING OUT THE INVENTION

Figure 1B:
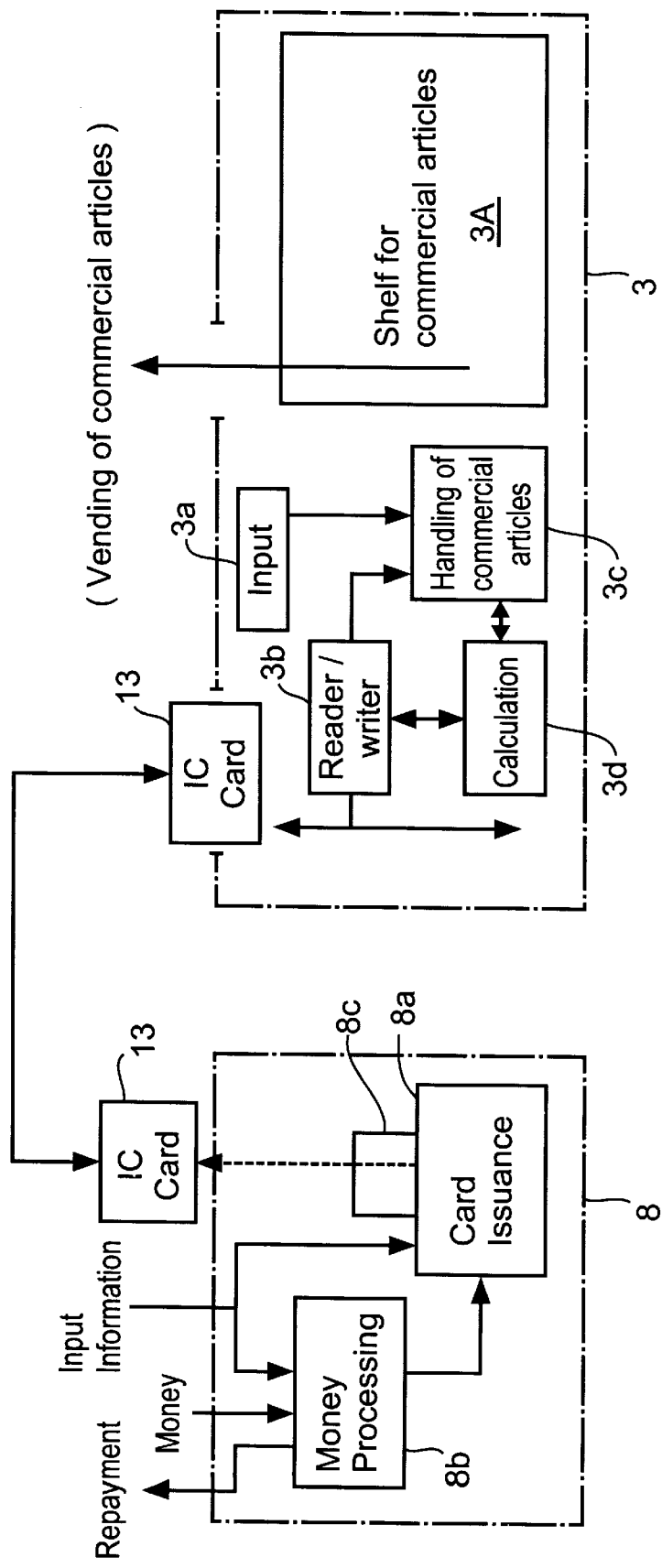
FIG. 1 shows an automatic commercial-article handling system according to the present invention, wherein (A) is a schematic constitutional view of a store system thereof and (B) is a schematic block diagram of a control system of a card issue/money deposit machine and an automatic vending machine.

Referring now to the drawings, the present invention will be explained in detail.
An Automatic Commercial-article Handling System Utilizing the IC Card FIG. 1(A) shows a store system in which an automatic commercial-article handling system utilizing the IC card of the present invention is adopted.

With reference to this figure, the store system 1 has a plurality of automatic vending machines and automatic renting machines for commercial articles equipped in a store 2. Namely, the store is equipped with an alcohol vending machine 3, a cigarette vending machine 4, an automatic vending machine 5 for juice or other drinks, an automatic vending machine 6 for other commercial items, and an automatic renting machine 7 for videocassette tapes. A card issue/money deposit machine 8 is also provided. An office 9 partitioned from the place where these machines are equipped is provided with a control computer system 10 for controlling these machines collectively. The control computer system 10 is connected via telephone lines 11 to a terminal such as a computer 12A or a telephone 12B equipped in the home or a firm of the customer.

As shown in FIG. 1(B), the card issue/money deposit machine 8 comprises a card issue means 8a or issuing the IC card 13 based on information input by the customer, a money handling means 8b for recording the amount of money put by the customer in the IC card 13 as a deposit. The money handling means 8b is constituted so that, based on recorded contents of the IC card 13 including the amount of deposit and purchase record of commercial articles, it gives a premium to the deposit that is to be recorded. For example, a premium according to the amount of deposit is given to the actual amount of deposit. Or, the customer who uses the card with high frequency is given a special benefit such as cash back and a premium to the deposit amount according to the frequency in use of card.

The money handling machine 8b is also constituted so as to repay the balance of deposit by cash in accordance with instructions by the customer.

The card issue means 8a of the card issue/money deposit machine 8 is provided with a reader/writer 8c which records information concerning the age of the customer, the amount of deposit and the like, and reads out recorded information of the IC card.

On the other hand, the commercial-article handling machine, for example, the alcohol automatic vending machine 3 comprises a commercial-article storing shelf 3A for storing alcoholic drinks, an input means 3a for allowing the customer to input the kind and number of alcoholic drinks, a reader/writer 3b for reading recorded contents from and writing information into the IC card, a handling means 3c for processing sales of alcoholic drinks based on input information about alcoholic drinks and recorded contents of the IC card 13, and a calculation means 3d for subtracting the amount of deposit recorded in the IC card according to the price of alcoholic drinks to be sold. The handling means 3c obtains the age of the customer from recorded contents of the inserted IC card, based on which it determines whether sales of alcoholic drinks is permitted or not. It prohibits sales of alcoholic drinks to minors.

Purchase of commercial articles in the store system 1 as constituted above is carried out as follows. The customer enters the store 2, and puts cash into the card issue/money deposit machine 8 and at the same time inputs his or her personal information. Whereby, the card issue/money deposit machine 8 prepares the IC card 13 for use as customer card and issues it to the customer. The IC card 13 has customer's information and the deposit amount recorded therein.

The customer inserts the issued IC card 13 into the alcohol vending machine 3 and specifies an alcoholic drink to be purchased, for example. The alcohol vending machine 3 reads the recorded contents of the IC card 13 by means of the reader/writer 3b. Where the customer is found to be a minor from the recorded contents, sales of alcohol drinks is prohibited, which is displayed on a screen or the like disposed on the input means 3a or other place, and the IC card 13 is ejected and returned to the customer.

Where the customer is adult, sales of alcoholic drinks to be specified is carried out. Then, the calculation means 3d subtracts the price of the sold alcohol drink from the amount of deposit recorded in the IC card 13, and the calculated result is written into the IC card 13 as the balance of deposit by means of the reader/writer 3b. Thereafter, the IC card 13 is returned to the customer.

While, in the store system 1, sales information of vending machines and other machines and inventory information of commercial articles are under administration of the control computer system 10. The control computer system 10 is connected to the computer terminal 12A, telephone 12B or the like equipped in the home or other place of each customer as mentioned above. Each customer is allowed to check inventory of commercial articles by operating the computer terminal or the like while staying at home. Of course, it is able to make order or reservation of commercial articles.

In case that the customer wishes to quit utilization of the store system 1, it is only necessary to return the IC card 13 back to the card issue/money deposit machine 8. Upon returning the IC card 13, the money handling means 8b repays the balance of deposit to the customer by cash. Consequently, different from the general prepaid card, the money paid initially would not be wasted.

As aforementioned, it is able to increase customer attracting force by adopting the store system 1 to sales and rental of commercial articles within a limited area such as a single unmanned store or its chain stores, not worldwide. At the same time, it is possible to realize reduction of labor in stores and to assure the same services as are given in manned stores.

The Card Issue/Money Deposit Machine

Figure 3:
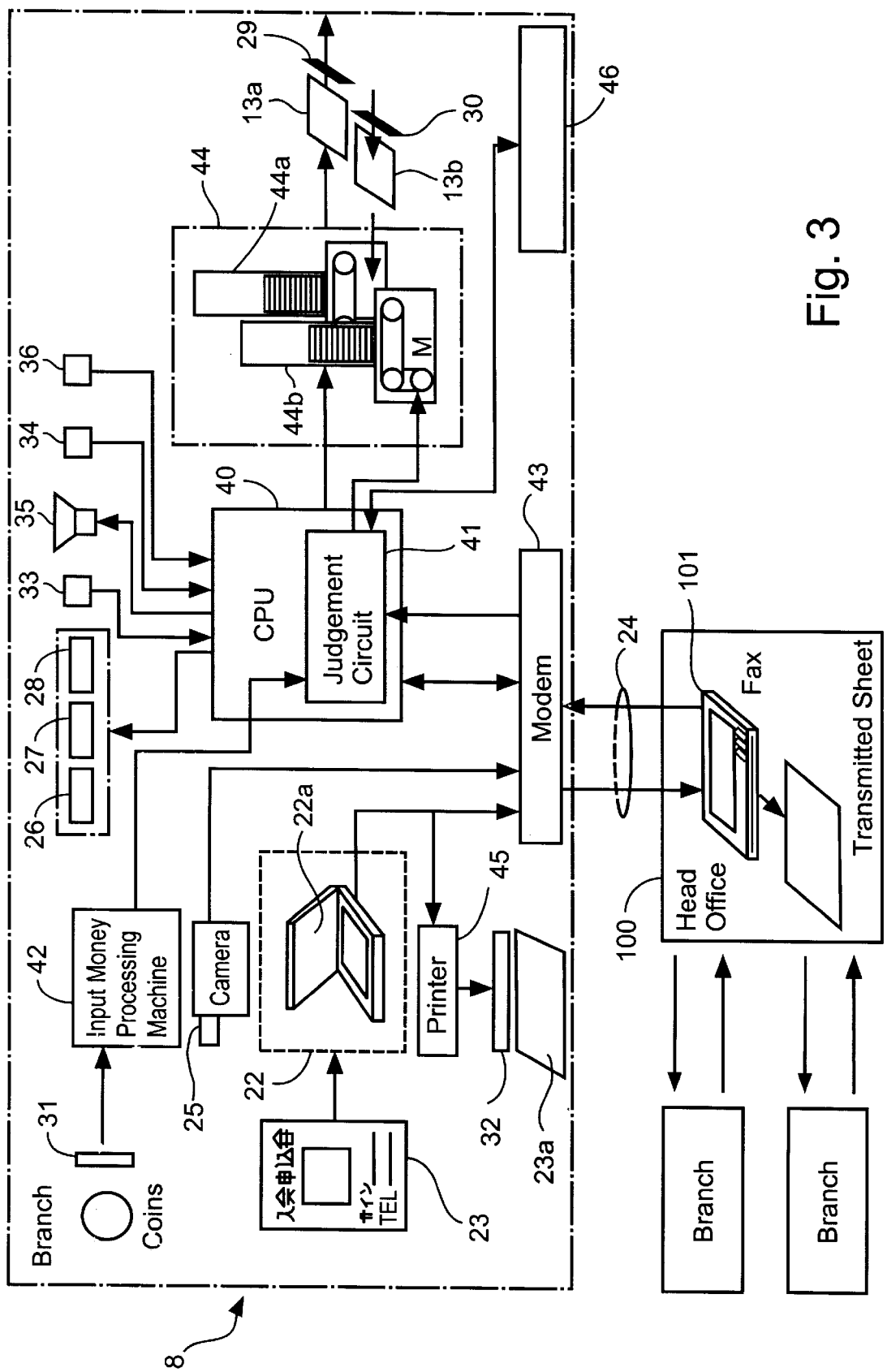
FIG. 3 is a schematic block diagram showing operation of the card issue machine of FIG. 2.
Figure 4:
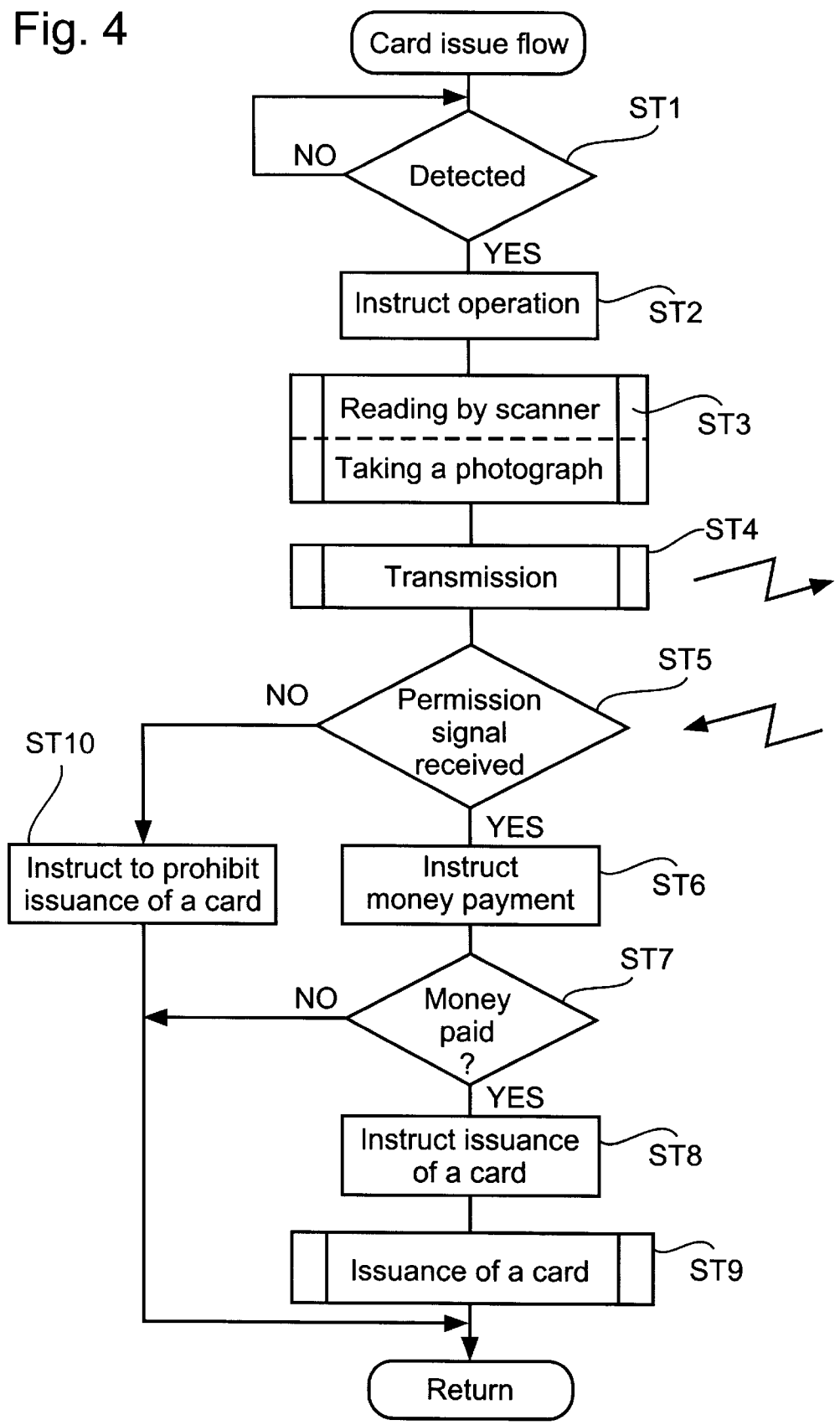
FIG. 4 is a general flow chart showing an issue operation of the IC card by the card issue machine of FIG. 2.

Referring to FIGS. 2 to 4, an example for realizing the card issue means 8a of the above card issue/money deposit machine 8 will be explained.

First, FIG. 2 shows an example of an external view of the card issue/money deposit machine 8. As shown in this figure, the card issue/money deposit machine 8 has an image scanner 22 assembled on its front surface. The image scanner 22 has a cover 22a, on the back of which information about operational procedure is described. A person asking for the IC card as customer card puts his or her driver's license card or other identification card on a designated area of a sheet of application form of membership 23 (see FIG. 3), and makes the image scanner 22 to read them, whereby the read information is transmitted to a remote head office 100 via a communications line 24. A still camera 25 is housed in a position above the image scanner 22 for taking a photograph of a person standing in front of it. Photographed information is transmitted to the head office 100, together with the information read by the image scanner.

On the upper portion of the front surface of the card issue/money deposit machine 8 are arranged ready lamp 26, a card issuing lamp 27 and a card issued lamp 28 for displaying operational conditions. A card issue/return slot 29 is provided at the middle position of the front surface. Under the image scanner 22 is provided a coin slot for membership fee, under which a printout slot 30 is provided. Further, a return slot 30 is provided for returning money back to the customer.

At the front surface of the card issue/money deposit machine 8 are provided a head-office communication button 33, a microphone 34 for allowing a person asking for membership to communicate with the head office, and a speaker 35 for allowing the head office to communicate and give operational instructions to a person asking for membership. In addition, a sensor 36 is also provided for detecting approach of a person toward the card issue/money deposit machine 8.

FIG. 3 generally illustrates the inner constitution of the card issue/money deposit machine 8, together with its control system. The control system is constituted mainly by a microcomputer 40 and carries out card issuing operation as mentioned below in accordance with built-in control programs. The computer 40 constitutes a judgement circuit 41 which receives a signal indicating that membership fee is put from an input money processing machine 42. From the head office 100, an instruction signal is input via the communications line 24 and a modem 43, the signal indicating whether issuance of card is permitted or not. The judgement circuit 41, based on these signals, determines whether or not issuance of card is allowed or not. When issuance of card is permitted, an issuance signal is supplied to a card issue/return section 44. The card issue/return section 44 is provided with a card issue section 44a and a card recovery section 44b. The IC card 13a issued from the card issue/return section 44 is written therein information including the date of birth for identifying the customer by means of the reader/writer 46. Likewise, recorded information of the IC card 13b returned to the card issue/return section 44 is read by the reader/writer 46.

While, a printer 45 is supplied with information obtained by the image scanner 22, and prints out a hard copy 23a of the application form of membership.

On the other hand, in the head office 100, a facsimile machine 101 is equipped as signal receiving means for receiving information transmitted from the branch shop. There is a person permanently stationed at the head office, who checks the received information and transmits to the branch shop the instruction signal concerning permission and prohibition of issuance of card via facsimile.

Next, referring to a general flow chart of FIG. 4, there will be explained a card issue operation performed by the card issue/money deposit machine 8. First, the customer stands in front of the card issue/money deposit machine 8, which is detected by the sensor 36 (step ST1). Upon detection, voice instructions for operation are made via the speaker 35 (step ST2). Contents of operation are also indicated on the back surface 22a of the cover of the image scanner 22. According to these instructions, a person asking for membership writes down the name and address in a sheet of application form of membership 23 and attaches his or her driver's license card thereon, and then places them on the image scanner 22, whereby the sheet of application form of membership 23 is scanned by the image scanner 22. At the same time, the built-in still camera is driven to take a photograph of the person asking for membership (step ST3).

The read information of the sheet of application form of membership 23 and the photographed information are transmitted to the head office 100 via the modem 43 and communications line 24 (step ST4). A permanent attendant at the side of head office 100 checks the information received. More specifically, by looking at a copy of application form of membership and the photograph of the person asking for membership, the permanent attendant checks whether membership criteria are satisfied and whether the person can be identified as himself or herself. When the person is admitted to membership, an issuance permission signal is sent out to the branch shop via the communications line 24, together with personal identifying information including the date of birth of the person asking for membership (step ST5). When issuance is judged not to allow, no procedure is taken.

The card issue/money deposit machine 8 instructs the person asking for membership to insert a desired amount of money via the speaker 35 when it receives the above issuance permission signal within a predetermined period of time (step ST6). Where it does not receive the issuance permission signal within the predetermined period of time, it informs the person asking for membership that card issuance is not allowed via the speaker 35 (step ST10), and finishes the operation.

Next, when money insertion is carried out within a predetermined period of time after money insertion is instructed, the input money processing machine 42 supplies a signal indicative of money insertion to the judgement circuit 41. The judgment circuit 41 is also supplied with the issuance permission signal transmitted from the head office. When both signals are supplied, an issuance instruction signal is supplied to the card issue/recovery section 44 (step ST8). As a result, the issuance section 44a of the card issue/recovery section 44 is driven to deliver a new membership card 13a therefrom. The delivered membership card 13a is written therein necessary information by means of the reader/writer 46 and then is issued to the customer via the card issuance slot 29.

Whereas, when money is not received within the predetermined period of time, it is judged that the person abandons obtaining membership and processing ceases without conducting issuance operation.

A Automatic Renting System Utilizing the IC Card

There will be described an example wherein the present invention is adopted to an automatic renting system for videocassette tapes.

Figure 5:
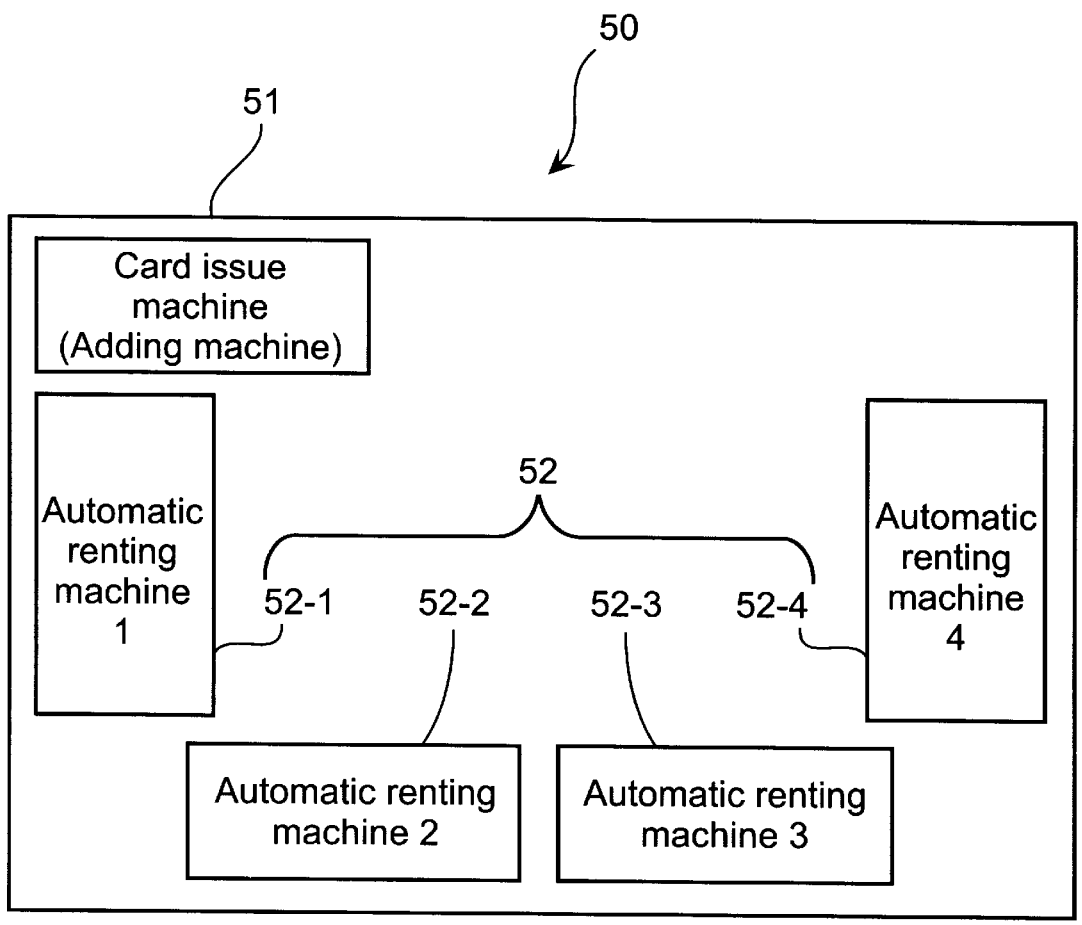
FIG. 5 is an illustration of an automatic renting machine for videocassette tapes according to the present invention.

FIG. 5 shows an arrangement of a video rental shop 50. As shown in this figure, the video rental shop 50 is provided with a card issue machine 51 for issuing the IC card as membership card, and a plurality of automatic renting machines 52 (52-1, 52-2, 52-3, 52-4 . . . ).

Conventionally, where a plurality of renting machines are equipped, it is not able to return the videocassette tape to a renting machine different from one that has rented out the same videocassette tape without networking these renting machines. On the contrary, in the present example, the IC card is utilized as membership card which has a memory capacity extremely larger than the magnetic card. Thus, recordation of a large amount of information in the IC card enables to return videocassette tapes to different renting machines.

More specifically, the IC card can store a large amount of information such as which videocassette tape is rented from which renting machine at which time and at what amount of money, how long rented period is, how much an additional charge is, or the like, whereby it is possible to realize return of videocassette tapes to different renting machines.

Consequently, each renting machine is able to recognize the number of videocassette tapes that have been rented out to the same customer from the respective renting machines equipped in the video rental shop. Thus, different from the conventional cases wherein the maximum number to be rented is regulated by the individual renting machines independently, it is able to avoid such a situation in which a large number of videocassette tapes have been rented out to the same customer.

Further, where the IC card stores the name, date of birth, admission date and other information of the member, the renting machine is allowed to display the birthday of the member, a congratulatory message, the renewal date of the card and other indications.

In particular, where the renting machine is constituted to calculate the age of the customer from the date of his or her birth recorded in the IC card and determines whether or not the customer is adult or not, it can avoid necessity of issuing adult and minor cards according to the age of the customers as is conventionally, which is convenient.

Whereas, since the magnetic card that is generally used as membership card can only store 69-line data at most, the above various procedures cannot be carried out. In addition, in order to carry out return operation of videocassette tapes between a plurality of renting machines, these renting machines must be connected via communications network. In this case, if the host computer breaks down due to malfunction or other reasons, the whole system would also break down, to interrupt renting operation, which is inconvenient.

However, where the IC card is utilized as membership card as in the present invention, a plurality of renting machines can be made as if they were networked via the IC card. Thus, there is no occurrence of a breakdown of the whole system due to the breakdown of the host computer.

As information to be recorded in the IC card, examples thereof are listed in table 1.

TABLE 1

(Example of recorded contents of the card)

1. area code
2. shop code
3. member code
4. name
5. date of birth
6. telephone number
7. valid date
8. registered date
9. amount of money available
10. remaining point
    (*minus point passible)
11. frequency in use
12. maximum number to be rented
13. password
14. renting-machine number
15. rented tape number
16. rented tape fee
** 17. arrears
18. rented date
19. returning due date
20. bar code number
    (** data capacity of 10 tapes)
21. machine in number in case returned to a different machine
22. date in case returned to a different machine
** 23. machine number to which a tape is returned
24. returned tape number
25. date returned
    (** data capacity of 10 tapes)

Next, table 2 shows an example of rental operation of videocassette tapes using the IC card, while table 3 shows an example of returning operation of videocassette tapes using the IC card.

TABLE 2

(Renting operation)

1. Insert the IC card into a renting machine.
2. Display the name, remaining point and current rented-out number on the screen.
3. Designate renting mode.
4. Input the number of tapes to be rented.
5. Input a renting period
6. Take the tape out.
7. Write a variety of date into the card.
   1) Point after subtraction of rental fee
   2) Renting machine number
   3) Tape number rented
   4) Tape rental fee
   5) Arrears
   6) Rented-out date
   7) Return due date
   8) Bar code number
8. Eject the card.

(* In case the card point is not remained, make the card issue machine to display request of point addition.)

TABLE 3

(Returning operation)

1. Insert the IC card into the IC card reader/writer of the renting machine
2. Display the name, remaining point and current rented-out number on the screen.
3. Designate returning mode.
4. Insert the tape into the machine.
   In case returned to a different machine,
   display 'the tape belongs to xxxx machine',
   then display 'continue?', 'YES' or 'NO', and,
   store the tape in the spare storing shelf when 'YES' is pressed.
   For the spare storing shelf of the machine, which tape belonging to which machine is returned by whom at which date or the like is recorded as settlement data.
5. When delay in return occurs, subtract delay point from the displayed point.
   (* In case the point is short, make the card issue machine to display request of point addition, and write various data into the card and eject the same. The shortage in point will be subtracted next time.)
6. Write various date into the card.
   1) Point after arrears are subtracted if they exist
   2) Machine number to which the tape is returned
   3) Returned tape number
   4) Return date
   5) Return tape bar code number
7. Eject the card.

INDUSTRIAL APPLICABILITY

As explained above, according to the automatic commercial-article handling system utilizing the IC card, and the automatic renting system for recorded media of the present invention, it can realize vending and rental operations of commercial articles in a manner that they are easily utilized by customers, based on a large amount of information recorded in the IC card.

Further, according to the IC card issue machine and the IC card issue system of the present invention, the IC card capable of storing a large amount of information can be utilized as customer card. Therefore, based on a large amount of information recorded in the IC card, it can realize vending and rental operations of commercial articles in a manner that they are easily utilized by customers.

What is claimed is:

1. An automatic commercial-article handling system utilizing an IC card, comprising:
   a card issue machine for issuing the IC card as a customer card, and a commercial-article handling machine for selling or renting of commercial articles by making use of the issued IC card, wherein
   the card issue machine has a card issue means for issuing the IC card based on input information by the customer, and a money handling means for recording the amount of money deposited by the customer as the amount of deposit in the IC card, wherein
   the commercial-article handling machine has an input means for inputting the kind and number of commercial articles, an IC card reader/writer, a commercial-article handling means for conducting selling, renting or returning operation of commercial articles based on commercial-article information input via the input means and on recorded information of the IC card, and a calculation means for processing subtraction operation of the deposit amount recorded in the IC card in accordance with the commercial article to be handled, and
   means for crediting the deposit amount with a premium in accordance with recorded contents in the IC card including the deposit amount and purchase record of commercial articles.

2. An automatic commercial-article handling system utilizing an IC card, comprising:
   a card issue machine for issuing the IC card as a customer card, and a commercial-article handling machine for selling or renting of commercial articles by making use of the issued IC card, wherein
   the card issue machine has a card issue means for issuing the IC card based on input information by the customer, and a money handling means for recording the amount of money deposited by the customer as the amount of deposit in the IC card, wherein
   the commercial-article handling machine has an input means for inputting the kind and number of commercial articles, an IC card reader/writer, a commercial-article handling means for conducting selling, renting or returning operation of commercial articles based on commercial-article information input via the input means and on recorded information of the IC card, and a calculation means for processing subtraction operation of the deposit amount recorded in the IC card in accordance with the commercial article to be handled, and
   means for repaying the balance of deposit recorded in the IC card upon returning of the IC card.

3. An automatic renting system for recorded media utilizing an IC card, comprising:
   a card issue machine for issuing the IC card as a customer card, and a renting machine for automatically renting recorded media such as videocassette tapes by making use of the issued IC card, wherein
   the card issue machine issues the IC card based on information input by the customer and the amount of input money, and wherein
   the renting machine has an input means for inputting at least the kind and the number of recorded media to be rented, an IC card reader/writer, a transfer mechanism for carrying out renting and returning operations of recorded media based on input information via the input means and recorded information of the IC card, and a control means for controlling the respective portions, and
   the renting machine controls a number of recorded media to be rented out by comparing the number of recorded media that had been rented out and a predetermined limit recorded in the IC card.

4. An automatic renting machine for automatically renting recorded media such as videocassette tapes utilizing an IC card issued as a customer card, comprising:
   an input means for inputting at least the kind and the number of a recorded medium to be rented, an IC card reader/writer, a storing shelf for storing recorded media, a transfer mechanism for carrying out renting and returning operations of recorded media based on input information via the input means and recorded information of the IC card, and a control means for controlling the respective portions, and
   means for controlling the number of recorded media to be rented out by comparing the number of recorded media that have been rented out and a predetermined limit recorded in the IC card.

5. An IC card issue machine for issuing an IC card as a membership card for using a commercial article handling machine which carries out automatic renting or automatic vending of videocassette tapes, comprising:

an image scanning means for scanning the identification card of a candidate for membership and an application form for membership, an input means for a customer to input information, an issue means for issuing an IC card based on information from the image scanning means and the input means, a money handling means which conducts receipt, calculation and repayment of money and records the amount of money input by the customer in the IC card to be issued as the amount of deposit, an IC card reader/writer, and a display means for displaying at least the amount of money input by the customer, the balance of deposit recorded in the IC card, and operational procedure of the issue machine, and means for crediting the deposit amount with a premium based on the recorded contents of the IC card including the amount of deposit and purchase record of commercial articles.

\* \* \* \* \*